United States Patent [19]

Anderson

[11] Patent Number: 4,977,851
[45] Date of Patent: Dec. 18, 1990

[54] LIGHT-REFLECTIVE MARKER

[76] Inventor: Harry J. Anderson, 6815 Douglas Ave., Racine, Wis. 53402

[21] Appl. No.: 453,973

[22] Filed: Dec. 20, 1989

[51] Int. Cl.$^5$ .................. G01D 21/00; F16B 7/10; B25G 3/00; F16D 1/00
[52] U.S. Cl. .................. 116/209; 403/109; 403/377
[58] Field of Search .................. 116/63 R, 63 P, 173, 116/209; 248/125, 188.5, 295.1, 298, 353, 354.1, 533; 40/612, 582, 610; 24/19; 403/108, 109, 110, 377; 404/10; 52/118, 147, 726; 350/97

[56] References Cited

U.S. PATENT DOCUMENTS

| | | | |
|---|---|---|---|
| 3,802,378 | 4/1974 | Kessler | 116/63 P |
| 3,916,815 | 11/1975 | Valley | 116/63 P |
| 3,933,117 | 1/1976 | Maietta | 116/28 R |
| 4,152,046 | 5/1979 | Knapp | 350/103 |
| 4,157,210 | 6/1979 | Mesman | 350/97 |
| 4,197,807 | 4/1980 | Campbell | 116/63 P |
| 4,343,567 | 8/1982 | Sarver et al. | 403/109 X |
| 4,407,505 | 10/1983 | Kendziorski | 116/173 X |
| 4,779,955 | 10/1988 | Schmanski | 350/97 |

FOREIGN PATENT DOCUMENTS

| | | | |
|---|---|---|---|
| 1094282 | 12/1960 | Fed. Rep. of Germany | 40/612 |
| 1593366 | 7/1981 | United Kingdom | 116/63 R |

Primary Examiner—William A. Cuchlinski, Jr.
Assistant Examiner—J. Folker
Attorney, Agent, or Firm—Arthur J. Hansmann

[57] ABSTRACT

A light-reflective marker for roadways or the like and having a supported stake with a tubular member telescope thereover. The upper end of the tubular member has light-reflective material effective on a 360-degree circle around the marker. The outer tubular member has approximately at least twice the interior diameter compared to the outer diameter of the stake which is telescoped within the tubular member. The two parts can be fully telescoped together and extend over the same length for the storage mode of the marker.

12 Claims, 1 Drawing Sheet

U.S. Patent
Dec. 18, 1990
4,977,851
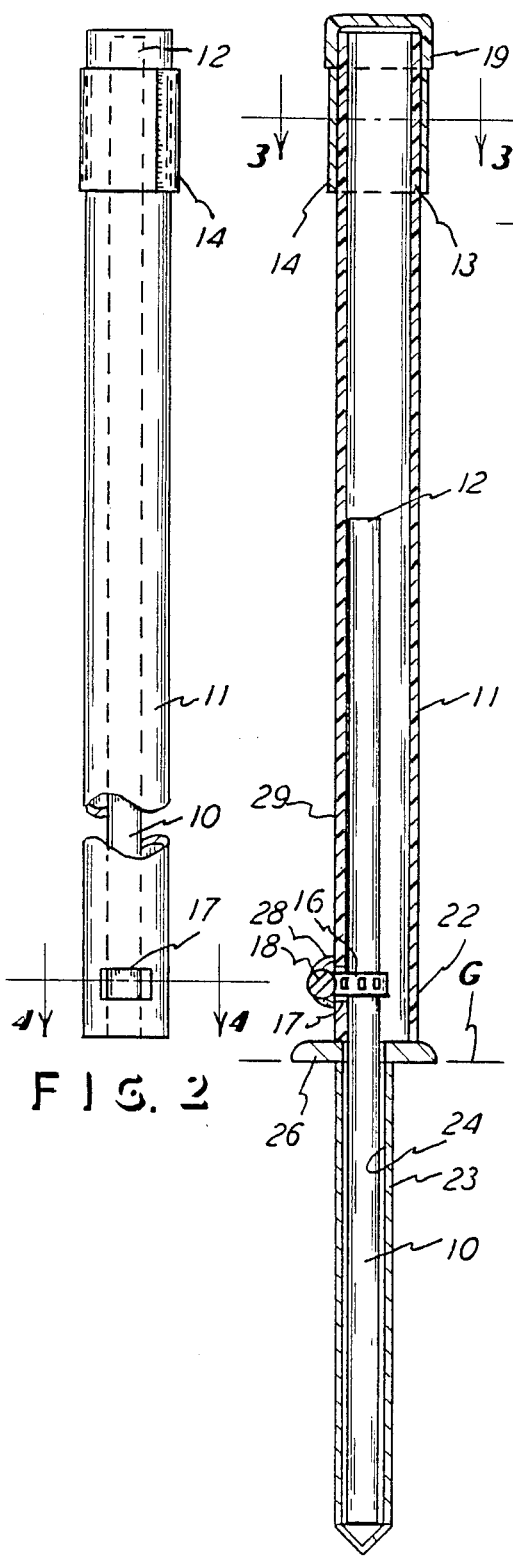
FIG. 2
FIG. 1
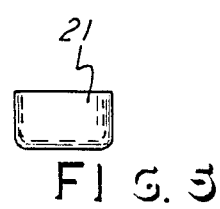
FIG. 3
FIG. 4
FIG. 5
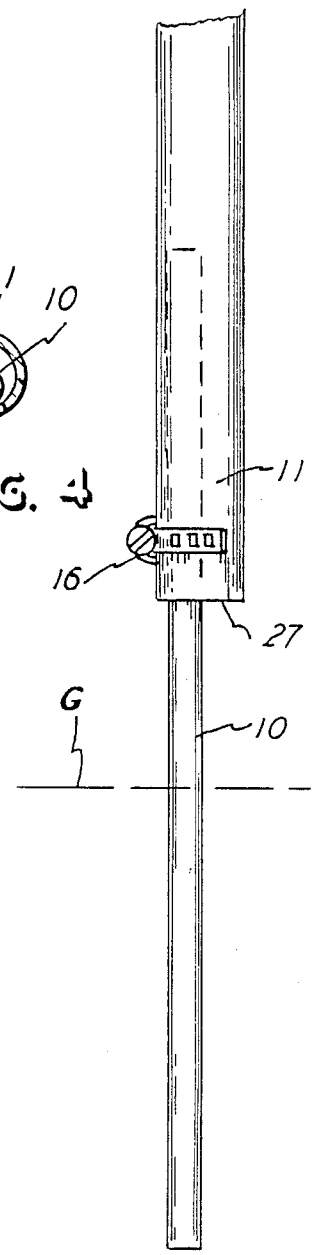
FIG. 6

LIGHT-REFLECTIVE MARKER

This invention relates to a light-reflective marker such as a type which can be used for marking a roadway, lot lines, docks, surveys, and the like outdoor markings.

BACKGROUND OF THE INVENTION

The prior art is already aware of light-reflective markers which are used for marking land and/or water, and a very well-known and common type is that which is used for marking roadways, such as driveways. Some of these markers are not capable of reflecting light from any approach to the marker, such as a 360-degree reflector. However, 360-degree roadway or the like markers are also known, and it is further known that these prior art markers can be inserted into the ground, such as by a ground-penetrating stake which supports a light-reflective material at the upper end thereof. U.S. Pat. Nos. 3,802,378, 3,933,117, 4,152,046, 4,157,210, 4,197,807, and 4,779,955 show light-reflective devices of the type mentioned heretofore.

The present invention improves upon the prior art by providing a light-reflective device which has a support or mounting stake which can be positioned upright, such as pounding into the ground, and a tubular member is placed over the upstanding upper end of the stake and is fastened thereto and presents a 360-degree reflective material on the upper end of that tubular member. In this arrangement, the stake and tubular member are fastened together in a simplified and easily and rapidly accomplished manner, and they are also attached together in an adjustable manner so that the tubular member can be placed at various elevations relative to the elevation of the stake itself.

Still further, the present invention provides for the light-reflective device wherein all of the parts thereof can be stored within a tubular member which is utilized as a packaging item for enclosing and retaining the stake and the attaching or clamp means and also for retaining the reflective material and caps on each end of the tubular member. That is, the complete collection of the several parts which constitute the installed device can all be stored within the tubular member, both for merchandise storing as well as user storing when the device is not in the installed or operative position.

Still further, the light-reflective marker of this invention includes a stake which can be hammered into the ground or the like, and in the event that the upper edge of the stake is distorted or enlarged, due to the force of hammering, the tubular member will still readily and easily slide over the upper end of the stake to be assembled with the stake and thereby stand upright above the elevation of the stake for presenting the reflective marker. Further, this telescopic relationship between the stake and the tubular member thereabove is such that the tubular member can be adjustably elevated relative to the stake and thereby present the reflective material at the upper end of the tubular member in any desired elevation, within the upstanding length of the stake itself.

Still further, the stake and the tubular member have a circular cross-section, and the connecting means therebetween is such that the tubular member can actually rotate around the stake in the final assembled and attached position and thereby move relative to a vehicle or the like which may brush against the tubular member. Accordingly, the vehicle will not be scratched or marred, and further, the tubular member is readily made of a plastic material, rather than a metal, to avoid scratching the car which might brush against the marker when it is used as a driveway or roadway marker. That is, the tubular member will actually simply roll along the side of a vehicle moving tangentially thereto, but in contact therewith, and thus avoid damage to the side of the vehicle.

With knowledge of the aforementioned patents, and particularly with reference to U.S. Pat. No. 4,779,955, it will be seen that the prior art is not concerned about, nor is it disclosing an arrangement whereby a stake can be pounded into the ground, and possibly upset the upper end of the stake and then still have the tubular member slid down on the stake, contrary to the present invention. Also, the prior art does not have the tubular member rotatable relative to the stake, to thereby avoid marring a car which can brush against the tubular member, nor does the prior art disclose any arrangement for vertically adjusting the tubular member relative to the stake, as in this invention.

Additionally, the present invention provides a light-reflective marker which can be installed in a sleeve inset into a support, such as in the ground, and the marker can then be removed from the sleeve, as desired, such as during seasonal use of the marker such as for the winter snowtime.

BRIEF DESCRIPTION OF THE DRAWINGS

FIG. 1 is a vertical section view of a preferred embodiment of this invention, and with the section being taken along the line 1—1 of FIG. 3.

FIG. 2 is a side elevational view of a fragment of the invention of FIG. 1, and with the parts in relative positions different from that of FIG. 1.

FIG. 3 is a sectional view taken along the line 3—3 of FIG. 1.

FIG. 4 is a sectional view taken along the line 4—4 of FIG. 2.

FIG. 5 is a side elevational view of a cap which can be placed on the bottom of the tubular member shown in FIGS. 1 and 2, for storage.

FIG. 6 is a side elevational view of a fragment of the marker of this invention, and showing the parts thereof in an elevated adjusted position relative to FIG. 1.

DETAILED DESCRIPTION OF THE PREFERRED EMBODIMENT

The drawings show a cylindrical stake 10 and a tubular member 11 telescoped thereover, and with both parts extending in an upright direction and above the ground line designated G. As shown, the lower half of the stake 10 is below the line G, which may be a ground line or dock or any other mounting surface, and the stake has approximately its upper half extending above the line. Also, in FIG. 1, the tubular member 11 shows its lower half extending co-extensive with the upper end of the stake 10, and then the upper half or thereabouts of the tubular member 11 extends vertically above the stake upper edge 12.

The tubular member has an upper end 13 which is surrounded by a light-reflective material 14, such as reflective tape wrapped therearound, as shown in FIGS. 1, 2, and 3. As such, the assembled marker can be placed adjacent a driveway, roadway, on a boat dock, lot line, or the like, and the 360-degree reflective material 14 will be visible from all angles laterally of the marker.

The stake 10 is of a material which can be hammered into the ground, and extend below the ground line G, and the tubular member 11 is of a plastic or non-metallic material which will retain its true and straight shape, as shown, even though it is virtually self-standing as shown in FIG. 1. Also, the tubular member 11 is of a material which will not scratch or otherwise mar the side of a vehicle or any other member which may brush against it, and, in fact, the tubular member 11 can actually rotate about the stake 10 when a tangential force is applied to the tubular member 11, such as when it is being brushed by a car passing tangentially thereto.

The stake 10 and the tubular member 11 can be attached together by means of a conventional hose clamp 16 which encircles the stake 10 and extends outside the tubular member 11 by projecting through a slot 17 in the tubular member 11. Therefore, the clamp screwhead 18 is accessible exteriorly from the tubular member 11, and therefore it can be tightened to secure the stake 10 and the tubular member 11 in axially adjustably, but fixed positions when the clamp 16 is tightened.

It will also be seen and understood that if and when the stake 10 is hammered into the ground or the like, then its upper end 12 may expand or flair out, but, it will be noted that the internal diameter of the tubular member 11 is approximately twice the outer diameter of the solid stake 10, and thus there is ample clearance between the two members for telescoping them into the position shown in FIG. 1, and there is no close fit required either for manufacture or for the assembly thereof. Nevertheless, the tubular member 11 is in a secure and vertically upright standing position when assembled over the upper end of the stake 10, as shown.

The stake 10 can be of a conventional material, such as a concrete reinforcing rod, or it can even be of a firm and strong plastic material which can be hammered into the ground, and also the tubular member 11 can be of a conventional material. Therefore, the entire assembly of the marker can be made of conventional material where the stake 10 can be cut into appropriate lengths from a supply of rod or like material, and also the tubular member 11 can be cut from appropriate lengths of tubing, and of course the clamp 16 is of a conventional hose clamp construction and the reflective material 14 is of a reflective tape material which can be wrapped around the upper end 13, as shown and mentioned.

A plastic or like cylindrical cap 19 is shown snugly disposed over the tubular member upper end 13 for enclosing the interior of the tube in the upper direction thereof. Also, a cylindrical plastic cap 21 can be provided for sliding over the tubular member lower end 22, just as with the cap 19 on the upper end 13. The stake 10 is of a length substantially the same, but no greater than, the axial length of the tubular member 11, and thus, when the stake 10 and tubular member 11 are fully telescoped together over the same overall axial extent, then the cap 21 can be placed over the tubular member lower end 22 and thus store the stake 10 within the tubular member 11, either for merchandising or for storing in an off-season by the user himself. It will of course be seen and understood that the clamp 16 always remains with the tubular member 11 in that it projects through the restricted slot 17 and the inner band of the clamp 16 is then expanded to where it cannot move outwardly through the slot 17, and of course the clamp screw 18 cannot move inwardly through the slot 17.

The drawings actually show that the tubular member 11 is axially offset from the longitudinal axis of the stake 10, and the tubular member 11 is therefore free to rotate around the longitudinal axis of the member 10 while the clamp 16 will also simply rotate about the stake 10 when sufficient force is applied tangentially to the tubular member 11, such as being brushed by a car or the like.

FIG. 1 also shows a ground or other support-embedded sleeve 23 which has a circular hollow interior 24 for telescoping receiving the lower end of the stake 10, as shown in FIG. 1. Also, the sleeve 23 has a head 26 which extends along the ground line G. With that arrangement, the sleeve 23 can be hammered into the ground or the like, and the stake 10 can then be inserted into the sleeve 23 for the upstanding positioning of the stake 10, and the stake 10 can be removed from the sleeve 23, and therefore removed from the ground, at season's end or whenever desired, and of course it can be re-inserted, as desired.

FIG. 6 shows the adjustment feature of the marker, and it will here be noted that the tubular member 11 is placed in an adjustably fixed position at an elevation above the ground line G. That is, the tubular member 11 has been elevated, relative to the fixed position of the stake 10, and the clamp 16 can then be tightened by means of its screw 18 to secure the tubular member 11 in the position shown in FIG. 6. With that arrangement, of course the tubular member lower edge 27 is above the ground line G, and thus the reflective material 14 can be placed at an optimum elevation, and also the lower edge 27 is clear of the ground or its supporting member, such as for grass trimming or uniformity along a row of the markers, or for like purposes.

Accordingly, the entire marker is made of conventional and readily available materials and parts, such as any cylindrical stake and the tubular member available in polyvinylchloride tubing or the like, and of course the clamp 16 is conventional and the caps 19 and 21 and the sleeve 23 are also conventional caps and pipe or like conventional material, respectively. The ground line G is a datum level, and the reflective material 14 can be adjustably positioned at selected elevations above that datum level, as described in connection with FIG. 6. Also, the stake 10 may be of a metal material, but the tubular member 11, being of plastic material, will avoid the weathering and dangers otherwise present if the upper end of the stake were not covered by the plastic tubular member 11.

Of course the opening 17 extends transversely of the longitudinal axis of the tubular member 11, and the hose clamp completely encircles the circumference of the stake 10, in the usual manner, but has its outer portions 28 in contact with the tubular member outer circumference 29, as shown in FIG. 1 and that is the conventional use of a conventional hose clamp 16. Also, with the opening 17 and thus the clamp 16 being in the tubular member lower end 22, one can readily position the clamp 16 by touching it for the purpose of inserting the stake 10 through the circular band of the clamp 16

FIG. 2 shows the stored position of the stake 10 within the length of the tubular member 11, and, with the additions of the caps 19 and 21 and the clamp 16, the entire marker would be self-contained for marketing or for user storage, and the sleeve 23 could be added thereto, if desired. In the installed position, the marker is completely cylindrical and is therefore uniformly visible from all 360-degree locations around it, and it is capable of withstanding the weather and forces of the wind or snow piled against the lower portions or the like.

The stake 10 is cylindrical, and the cross-sectional size of the hollow interior of the tubular member 11 is substantially greater than the cross-section of the stake. Therefore, the tubular member 11 can rotate about the stake 10 when brushed tangentially by an object passing by. The clamp 16 should allow the rotation, or it could be omitted.

Where the stake 10 is of a non-metallic material, if an electric cable were contacted in the ground, there would be no concern regarding conductivity.

What is claimed is:

1. A light-reflective marker comprising a stake to extend upright and having an upper end at an elevation above a datum level, a tubular member having a cylindrical wall and being telescopically disposed over said upper end of said stake and extending thereabove at a higher elevation and having an upper end, light-reflective material extending around said upper end of said tubular member, and releasably adjustable attachment means in contact with said stake and being accessible at the external circumference of said cylindrical wall and being in contact with said cylindrical wall for attaching said tubular member with said stake at any selected location along the upright length of said stake for positioning said light-reflective material at any selected elevation above the datum level.

2. The light-reflective marker as claimed in claim 1, wherein said stake is a cylindrical rod, and said tubular member has a hollow interior of at least approximately twice the cross-sectional diameter as that of said stake for ample clearance in telescoping over said stake.

3. The light-reflective marker as claimed in claim 2, wherein said stake is of metal material and said tubular member is of plastic material to thereby avoid marring a vehicle contacting said tubular member and to be weather resistant.

4. The light-reflective marker as claimed in claim 1, wherein said stake is of a length no greater than that of said tubular member for storage of said stake fully within said tubular member, and includes caps attachable over both ends of said tubular member for holding said stake inside said tubular member.

5. The light-reflective marker as claimed in claim 1, wherein said stake is of a material capable of being driven into the ground, and said attachment means being arranged to surround said stake and extend through said tubular member and said attachment means includes a screw for axially adjustable attachment of said tubular member to said stake.

6. The light-reflective marker as claimed in claim 1, wherein said attachment means is a circular clamp of the hose-clamp type and it encircles said stake and is connected with said tubular member.

7. The light-reflective marker as claimed in claim 6, wherein said tubular member has an opening extending transversely therein adjacent the end thereof opposite said upper end, and said clamp extends through said opening for connecting with said tubular member.

8. The light-reflective marker as claimed in claim 1, including a ground-penetrating sleeve arranged to be hammered into the ground and having an elongated upright opening therein, said stake being slidably telescoped into said sleeve for extending thereabove and above the ground level, thereby facilitating insertion and withdrawal of said stake relative to said sleeve.

9. The light-reflective marker as claimed in claim 8, wherein said sleeve has an upper flange which extends radially outwardly in a complete circle and is disposed at the ground level, for facilitating hammering said sleeve into the ground and to protect against entry of foreign matter falling into said upright opening.

10. A light-reflective marker comprising a cylindrical stake for positioning affixed in the ground to be non-rotatable and to extend upright and having an upper end at an elevation above a datum level, a tubular member telescopically disposed over said upper end of said stake and extending thereabove at a higher elevation and having an upper end, light-reflective material extending around said upper end of said tubular member, said tubular member being of a hollow interior cross-sectional size substantially greater than the cross-sectional size of said non-rotatable cylindrical stake to be continuously and 360-degree rotatable around the longitudinal axis of said stake when brushed by an object moving tangentially of said tubular member.

11. The light-reflective marker as claimed in claim 10, wherein said stake is a cylindrical rod, and said tubular member has a hollow interior of at least approximately twice the cross-sectional diameter as that of said stake for ample clearance in telescoping over said stake, and a circular clamp interconnected between said rod and said tubular member and being capable of connecting to said rod at any orientation around the entire circumference of said rod.

12. The light-reflective marker as claimed in claim 10, wherein said stake is of metal material and said tubular member is of plastic material to thereby avoid marring a vehicle contacting said tubular member and to be weather resistant.

* * * * *